United States Patent [19]
DeLeon et al.

[11] 3,982,632
[45] Sept. 28, 1976

[54] THERMOPLASTIC INJECTION RUNNER TRANSFER SYSTEM

[75] Inventors: Isrrael M. DeLeon, West Chicago; Edward D. Thompson, South Elgin, both of Ill.

[73] Assignee: Owens-Illinois, Inc., Toledo, Ohio

[22] Filed: June 23, 1975

[21] Appl. No.: 589,215

[52] U.S. Cl. ................................ 209/75; 209/78; 209/99
[51] Int. Cl.² ........................................ B07C 9/00
[58] Field of Search .................. 209/75, 76, 77, 78, 209/97, 99

[56] References Cited
UNITED STATES PATENTS

| | | | |
|---|---|---|---|
| 3,651,938 | 3/1972 | Sullentrop | 209/78 |
| 3,704,780 | 12/1972 | Aidlin | 209/99 |

Primary Examiner—Allen N. Knowles
Attorney, Agent, or Firm—A. J. Steger; E. J. Holler

[57] ABSTRACT

An improved transfer system is provided for guiding a thermoplastic injection runner from a conveyor into a collection hopper. A thermoplastic runner, which results from the injection molding of plastic parts, such as closures, is moved by a conveyor to a transfer drum which utilizes spikes to direct the runner into the hopper. The closures are separated from the runner as it moves along the conveyor and fall into a collection device at the end of the conveyor. A unique separation grid is positioned above the transfer drum and serves as a guide for the runner as it is directed by the spikes on the transfer drum from the conveyor into the hopper. The separation grid prevents the runner from becoming entangled with the drum or from dropping to the floor. The runner material collected in the hopper can be salvaged for recycling after it has been processed in a grinder.

1 Claim, 1 Drawing Figure

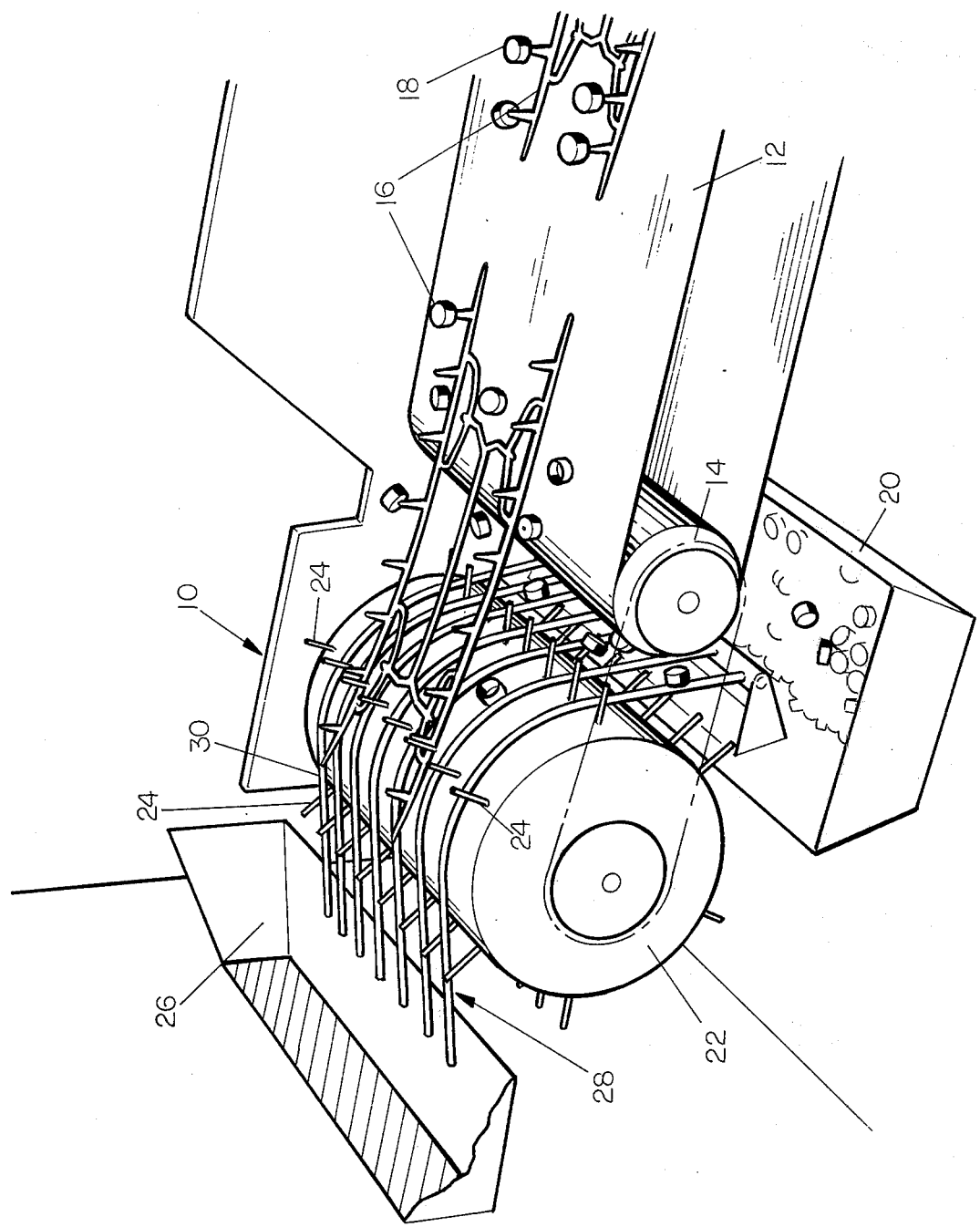

THERMOPLASTIC INJECTION RUNNER TRANSFER SYSTEM

BACKGROUND OF THE INVENTION

This invention relates to thermoplastic injection molding and, more particularly, it relates to an improved transfer system for guiding a thermoplastic injection runner from a conveyor into a collection hopper.

In the formation of plastic parts by means of thermoplastic injection, a connecting web or runner of plastic material is formed connecting the parts being molded. The resulting runner and parts being molded are fed onto a conveyor for movement to a collection point. The molded parts, such as closures, are normally vibrated loose from the runner as they are transported on the conveyor. These parts are then deposited into a collection device at the end of the conveyor. The plastic material in the runner is capable of being recycled if it can be recovered without damage or contamination. The prior art has included a transfer drum which incorporated spikes thereon for picking up the runner as it reaches the end of the conveyor for transferring into a hopper attached to a grinder. It has been found, however, that the use of such a spiked transfer drum has resulted in the runner becoming wrapped around the transfer roll or dropping to the floor. In the former case, the process must be stopped while the runner is disengaged from the transfer drum. In the latter case, the runner, which has dropped to the floor, may become contaminated and nonreuseable for recycling purposes.

SUMMARY OF THE INVENTION

It is, therefore, an object of this invention to provide an improved transfer system for guiding a thermoplastic injection runner from a conveyor into a grinder hopper which eliminates the disadvantages associated with presently available devices. A thermoplastic runner, which results from the injection molding of plastic parts, such as closures, is moved by a conveyor to a transfer drum which utilizes spikes to direct the runner into the hopper. The closures are separated from the runner as it moves along the conveyor and fall into a collection device at the end of the conveyor. A unique separation grid is positioned above the transfer drum and serves as a guide for the runner as it is directed by the spikes on the transfer drum from the conveyor into the hopper. The separation grid prevents the runner from becoming entangled with the drum or from dropping to the floor. The runner material collected in the hopper can be salvaged for recycling after it has been processed in a grinder.

Other objects, features and advantages of this invention will become apparent to one skilled in the art upon reference to the following detailed description of the invention and the drawing illustrating a preferred embodiment thereof.

IN THE DRAWING

The FIGURE is a schematic perspective view of the improved transfer system incorporating the unique separation grid of this invention.

DESCRIPTION OF THE PREFERRED EMBODIMENT

A unique thermoplastic injection runner transfer system incorporating the features of this invention is indicated generally in the FIGURE by the numeral 10. A conveyor belt 12 is driven by means of a conveyor roller 14, so as to transport a plurality of thermoplastic injection runners 16. The thermoplastic injection runners 16 conform to the overflow chambers of the injection molding apparatus and have attached thereto a plurality of molded plastic parts, such as the closures indicated by the numeral 18 in this FIGURE. As the runners 16 are transported by means of the conveyor belt 12, the closures 18 are vibrated loose from the runners 16, so as to fall from the end of the conveyor belt 12 into a closure collection device 20. The closures 18 in the collection device 20 are ready to be inspected, sorted and shipped. The runners 16 comprise a large quantity of scrap material which is very desirable for recycling for use in the injection molding of additional closures. Therefore, it is desirable to salvage the runners 16 as they reach the end of the conveyor belt 12 for transfer into a grinding apparatus for recycling.

The transfer apparatus 10 includes a transfer roll 22 which has formed thereon a plurality of spikes 24 which serve to pick up the runners 16 as they leave the conveyor belt 12. The spikes 24 revolving with the transfer drum 22 propel the runners 16 into a grinder hopper 26, whereupon the runners may be fed to a grinder (not shown) for recycling.

To ensure the proper transfer of the runners 16 from the conveyor belt 12 into the grinder hopper 26, a unique separation grid 28 is provided. The separation grid 28 comprises a plurality of rods 20 which are positioned over and around the transfer drum 22 and separated so that the spikes 24 pass therebetween. The individual separation rods 20 provide a guide path for the runners 16, so that they are transferred directly from the conveyor belt 12 into the grinder hopper 26. The use of the separation grid 28 thereby prevents the runners 16 from becoming entangled or wrapped around the transfer drum 22. It also prevents the runners 16 from coming into contact with other portions of the machinery or from dropping to the floor. In either of these cases, the runner would become contaminated and not be useable for recycling into the injection molding process. It has been found that the separation grid of the type disclosed by this invention provides excellent spacing of the runners from the transfer drum as the runners are fed into the grinder hopper. The use of the separation grid, as taught by this invention, also allows for a reduction in the number of spikes utilized on the transfer drum. In addition, the use of the separation grid eliminates the need for a fabric cover, which was used to secure the spikes to the drum and to prevent the runners from coming into direct contact with the drum.

We claim:

1. A transfer system for guiding a thermoplastic injection runner from a conveyor into a collection hopper comprising, in combination:

a transfer drum rotatably mounted between said conveyor and said collection hopper;

a plurality of spike members attached to and extending outwardly from said transfer drum for engaging said runner as it leaves said conveyor and moving said runner into said collection hopper; and a separation grid means, including a plurality of rod members spaced from and overlying said rotating transfer drum and extending from a location adjacent said conveyor to a location adjacent said collection hopper, to provide a guide path for said runner as it is moved by said spike members on said rotating transfer drum toward said collection hopper, said rod members being spaced from each other to allow said spike members on said rotating transfer drum to pass therebetween.

\* \* \* \* \*